(12) United States Patent
Yamagishi

(10) Patent No.: US 10,305,953 B2
(45) Date of Patent: May 28, 2019

(54) CONTENT SUPPLYING APPARATUS, CONTENT SUPPLYING METHOD, PROGRAM, TERMINAL DEVICE, AND CONTENT SUPPLYING SYSTEM

(71) Applicant: Saturn Licensing LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 64 days.

(21) Appl. No.: 15/024,895

(22) PCT Filed: Sep. 12, 2014

(86) PCT No.: PCT/JP2014/074247
§ 371 (c)(1),
(2) Date: Mar. 25, 2016

(87) PCT Pub. No.: WO2015/045917
PCT Pub. Date: Apr. 2, 2015

(65) Prior Publication Data
US 2016/0294904 A1 Oct. 6, 2016

(30) Foreign Application Priority Data
Sep. 27, 2013 (JP) .................. 2013-202440

(51) Int. Cl.
*H01L 29/08* (2006.01)
*H04L 29/06* (2006.01)
(Continued)

(52) U.S. Cl.
CPC ........ *H04L 65/601* (2013.01); *H04L 65/4069* (2013.01); *H04L 65/4076* (2013.01);
(Continued)

(58) Field of Classification Search
CPC .......... H04N 21/6405; H04N 21/85406; H04L 67/02; H04L 65/4069; H04L 65/4076; H04L 65/601
See application file for complete search history.

(56) References Cited

U.S. PATENT DOCUMENTS

2013/0254634 A1\* 9/2013 Luby ................ H04L 67/06
714/776
2014/0219088 A1 8/2014 Oyman et al.
(Continued)

FOREIGN PATENT DOCUMENTS

WO WO 2013/019903 A1 2/2013
WO WO 2013/048484 A1 4/2013
WO WO 2013/109551 A1 7/2013

OTHER PUBLICATIONS

Extended European Search Report dated Mar. 8, 2017 in Patent Application No. 14848207.8.
(Continued)

*Primary Examiner* — Kim T Nguyen
(74) *Attorney, Agent, or Firm* — Oblon, McClelland, Maier & Neustadt, L.L.P.

(57) ABSTRACT

A content supplying apparatus, a content supplying method, a program, a terminal device, and a content supplying system capable of notifying a correspondence relation between a FLUTE stream and a segment stream to a reception side, and applicable to a system distributing a content in the FLUTE multicast manner. The content supplying apparatus includes: a FLUTE stream generating unit that generates a FLUTE stream based on a fragment stream and generates an SDP by describing information relating to an MPD in which information required for the reception side to acquire information relating to a FLUTE session distributing the FLUTE stream and the fragment stream corresponding to the FLUTE stream is described; and a multicast
(Continued)

distribution unit that distributes the FLUTE stream and the SDP in a FLUTE multicast manner.

16 Claims, 7 Drawing Sheets

(51) Int. Cl.
    *H04N 21/6405* (2011.01)
    *H04N 21/854* (2011.01)
    *H04L 29/08* (2006.01)

(52) U.S. Cl.
    CPC ......... *H04L 67/02* (2013.01); *H04N 21/6405* (2013.01); *H04N 21/85406* (2013.01)

(56) References Cited

U.S. PATENT DOCUMENTS

2014/0372570 A1* 12/2014 Gupta .................. H04L 67/06
    709/219
2017/0026148 A1    1/2017 Luby et al.

OTHER PUBLICATIONS

International Search Report dated Dec. 16, 2014 in PCT/JP2014/074247.

Mitsuhiro Hirabayashi, "Realizing the Uninterrupted Video Distribution in the Existing Web Server, An Exposition on "MPEG-DASH," the Next-Generation Standard of Video Distribution" Nikkei Electronics, Mar. 19, 2012, pp. 77-85 (with English language translation).

* cited by examiner

FIG. 4

```
v=0
o=user123 2890844526 2890842807 IN IP6 2201:056D::112E:144A:1E24
s=File delivery session example
i=More information
t=2873397496 2873404696
a=mbms-mode:broadcast 1238691083302929 1
a=FEC-declaration:0 encoding-id=1
a=source-filter: incl IN IP6 * 2001:210:1:2:240:96FF:FE25:8EC9
a=flute-tsi:3 m=application 12345 FLUTE/UDP 0
c=IN IP6 FF1E:03AD::7F2E:172A:1E24/1
b=64
a=lang:EN
a=FEC:0
a=single-fmt:video H264/90000 promiscuous
a=mpd-mapping:111 222 http://a.com/a
```

SESSION DESCRIPTION SECTION

MEDIA DESCRIPTION SECTION

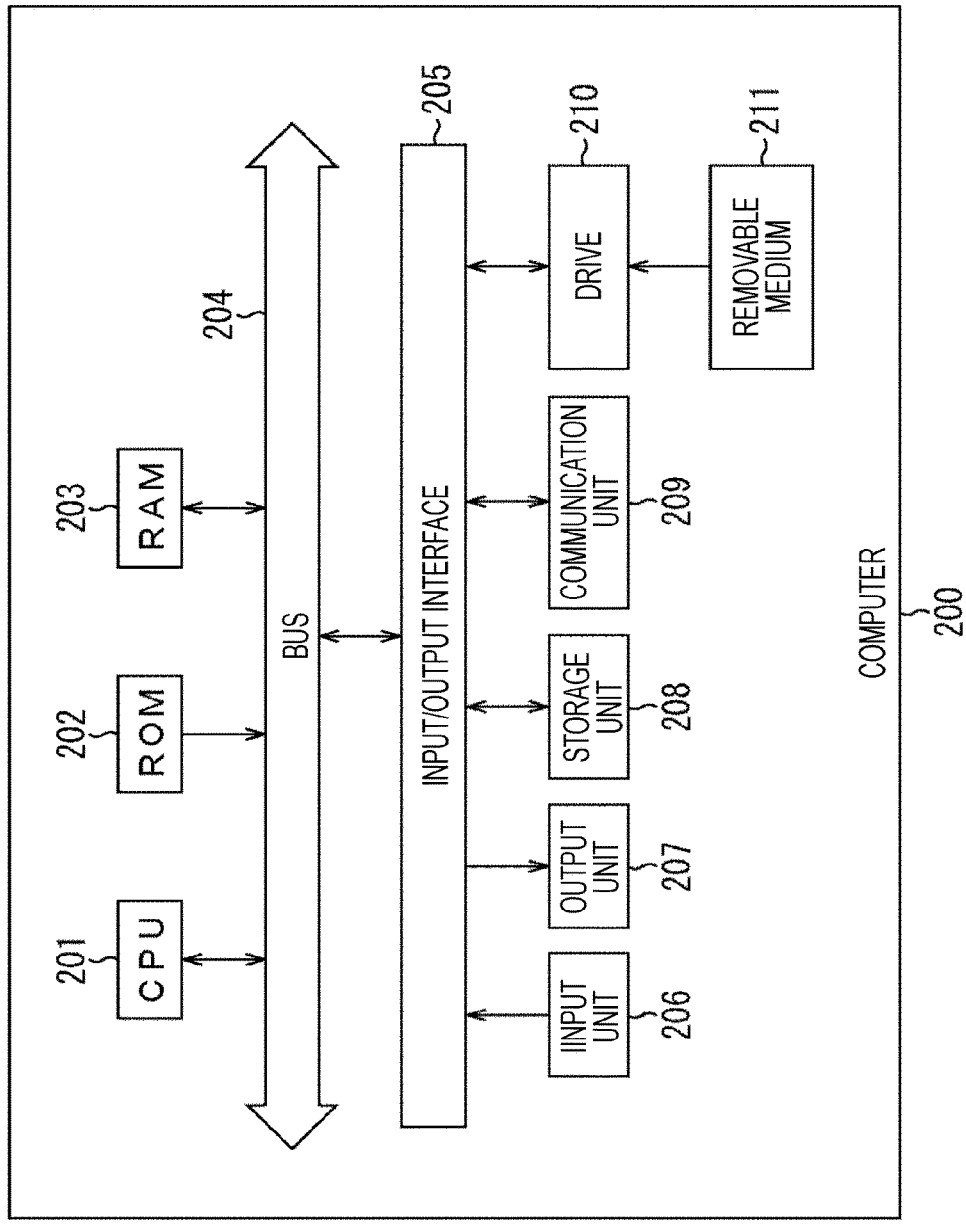

CONTENT SUPPLYING APPARATUS, CONTENT SUPPLYING METHOD, PROGRAM, TERMINAL DEVICE, AND CONTENT SUPPLYING SYSTEM

TECHNICAL FIELD

The present disclosure relates to a content supplying apparatus, a content supplying method, a program, a terminal device, and a content supplying system, and more particularly, to a content supplying apparatus, a content supplying method, a program, a terminal device, and a content supplying system that are appropriate for the use of a case where a content is distributed through File Delivery over Unidirectional Transport (FLUTE) multicast.

BACKGROUND ART

In recent years, Over The Top Video (OTT-V) becomes the main stream of streaming services using the Internet, and, as a moving picture distribution protocol, which is internationally standardized, that can be used therefor, Moving Picture Experts Group-Dynamic Adaptive Streaming over HTTP (MPEG-DASH; hereinafter referred to as DASH) using an HTTP similar to that for reading a web site or the like has been known (for example, see Non-Patent Document 1).

In DASH, an adaptive streaming technology is realized. In other words, the content supply side is configured to prepare a plurality of streams that have a same content and have mutually-different bit rates according to a difference in the image quality, the angle of view, the size, and the like and distribute the streams. On the other hand, the content reception side is configured to select an optimal stream according to the communication environments of the Internet, the decoding capacity thereof, and the like from among the plurality of streams prepared on the supply side and receive and reproduce the selected stream.

In addition, the supply side is configured to supply a metafile called a Media Presentation Description (MPD) to the reception side such that a stream can be adaptively selected, received, and reproduced on the reception side.

In the MPD, the address (url information) of a server (supply source) supplying a stream (media data such as an audio, a video, a subtitle, and the like) of a content formed as a chunk to the reception side is described. The reception side requests a stream by accessing a server that is a supply source of a content based on corresponding url information and receives and reproduces the stream that is distributed from the server in an HTTP unicast manner in response to the request.

FIG. 1 illustrates an example of the configuration of a content supplying system that distributes a content in a steaming manner based on DASH.

This content supplying system 10 is configured by: a plurality of content supplying apparatuses 20 supplying contents; and a plurality of DASH clients 30 receiving and reproducing contents. Each DASH client 30 can be connected to the content supplying apparatuses 20 through a Contents Delivery Network (CDN) 12 using the Internet 11.

The content supplying apparatus 20 distributes a plurality of streams that have a same content and have mutually-different bit rates. Each content supplying apparatus 20 includes: a content management server 21; a DASH segment streamer 22; and a DASH MPD server 23.

The content management server 21 manages source data of a content to be distributed to the DASH client 30, generates a plurality of pieces of streaming data having mutually-different bit rates based on the source data, and outputs the generated streaming data to the DASH segment streamer 22.

The DASH segment streamer 22 generates segment streams, for example, of fragmented MP4 or the like by dividing each unit of streaming data into segments with respect to time and maintaining the generated segment streams as files. In addition, the DASH segment streamer 22 distributes the maintained file of a segment stream in an HTTP unicast manner to a request source in response to a request (HTTP request) from the DASH client 30 as a web server. Furthermore, the DASH segment streamer 22 notifies metadata including an address representing the supply source of the file of the segment stream to the DASH MPD server 23.

The DASH MPD server 23 generates an MPD in which an address representing the supply source (in other words, the DASH segment streamer 22) of the file of a segment stream. In addition, the DASH MPD server 23 distributes the MPD generated in response to a request (HTTP request) from the DASH client 30 as a web server to the request source in an HTTP unicast manner.

The DASH client 30 requests the DASH MPD server 23 for an MPD and receives the MPD that is distributed in the HTTP unicast manner in response thereto. In addition, the DASH client 30 requests the DASH segment streamer 22 for the file of a segment stream based on the received MPD and receives and reproduces the file of the segment stream that is distributed in the HTTP unicast manner in response thereto.

In addition, the CDN 12 includes a cache server (not illustrated in the drawing), and the cache server caches an MPD and the file of a segment stream distributed through the CDN 12 in the HTTP unicast manner. Then, the cache server can distribute the MPD or the segment stream that is cached to a request source in response to a request from the DASH client 30 in the HTTP unicast manner in place of the DASH MPD server 23 or the DASH segment streamer 22 as a web server.

CITATION LIST

Non-Patent Document

Non-Patent Document 1: "Realization of Non-interrupted Moving Picture Distribution Using Existing Web Server", Hirabayashi Mitsuhiro, NIKKEI ELECTRONICS 2012.3.19

SUMMARY OF THE INVENTION

Problems to be Solved by the Invention

As described above, in the DASH, an adaptive streaming technology using HTTP unicast distribution is realized.

Meanwhile, in a case where the DASH client 30 can perform not only the reception of an HTTP unicast distribution but also a FLUTE multicast distribution, for example, using a mobile communication network represented by 3GPP or the like, it is desirable to perform the FLUTE multicast distribution of the stream of a content.

In other words, since QoS (band guarantee, delay, and the like) is protected in the FLUTE multicast distribution, in a case where a content requiring a real time property such as a live video is distributed, compared to the HTTP unicast distribution, the stream of a content can be stably supplied to a plurality of reception sides simultaneously.

In addition, in a case where the DASH client 30 can receive only an HTTP unicast distribution, an operation may be considered in which a cache server disposed on the CDN 12 or a local network of the reception side receives and caches a FLUTE multicast distribution and distributes a stream of a cached content to a request source in the HTTP unicast manner in response to a request from the DASH client 30.

However, for notifying the IP address and the port number of a FLUTE session used for distributing a stream of a content in a FLUTE multicast manner to the reception side such as the DASH client 30 or the cache server, generally, a Session Media Protocol (SDP) transmitted in a presentation layer of the FLUTE is used.

On the other hand, for notifying an IP address of a web server (DASH segment streamer 22) distributing a stream of a content in the HTTP unicast manner as described above to the reception side, an MPD is used.

In this way, in the SDP and the MPD, while information relating to a segment stream and information relating to a FLUTE stream respectively corresponding thereto are described, a method for describing the correspondence relation therebetween has not been determined. More specifically, for example, a correspondence relation with AdaptationSet or Representation described in the MPD cannot be described in the SDP.

The present disclosure is in consideration of such situations and enables the reception side to be notified of a correspondence relation between a FLUTE stream distributed in the FLUTE multicast manner and a segment stream distributed in the HTTP unicast manner.

Solutions to Problems

According to a first aspect of the present disclosure, in a content supplying apparatus distributing a content by using an adaptive streaming technology, the content supplying apparatus includes: a fragment stream generating unit that generates a fragment stream based on source data of the content; an MPD generating unit that generates an MPD describing information required for a reception side to acquire the fragment stream distributed in an HTTP unicast manner; a unicast distribution unit that distributes the MPD and the fragment stream in the HTTP unicast manner; a FLUTE stream generating unit that generates a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and a multicast distribution unit that distributes the FLUTE stream and the SDP in a FLUTE multicast manner.

The FLUTE stream generating unit may describe the information relating to the MPD in the SDP by using an attribute row defined for describing the information relating to the MPD.

The attribute row may be "a=mpd-mapping:<mpd url><adaptation set id><representation id><base url>".

The FLUTE stream generating unit may describe at least one of <mpd url>, <adaptation set id>, <representation id>, and <base url> that are description elements of the attribute row in the SDP.

The FLUTE stream generating unit may further describe a reception mode in the SDP by using an attribute row defined for describing the reception mode of a case where the FLUTE session distributing the FLUTE stream is received by the reception side.

The attribute row may be "a=single-fmt:<media><encoding name><receive mode>".

The FLUTE stream generating unit may describe one of Promiscuous, One-copy, and Keep-updated in "<receive mode>" of the attribute row as the reception mode.

According to the first aspect of the present disclosure, in a content supplying method used in a content supplying apparatus distributing a content by using an adaptive streaming technology, the content supplying method includes: a fragment stream generating step of generating a fragment stream based on source data of the content; an MPD generating step of generating an MPD describing information required for a reception side to acquire the fragment stream distributed in an HTTP unicast manner; a unicast distributing step of distributing the MPD and the fragment stream in the HTTP unicast manner; a FLUTE stream generating step of generating a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and a multicast distributing step of distributing the FLUTE stream and the SDP in a FLUTE multicast manner, the fragment stream generating step, the MPD generating step, the unicast distributing step, the FLUTE stream generating step, and the multicast distributing step being performed by the content supplying apparatus.

According to the first aspect of the present disclosure, a program causes a computer distributing a content by using an adaptive streaming technology to function as: a fragment stream generating unit that generates a fragment stream based on source data of the content; an MPD generating unit that generates an MPD describing information required for a reception side to acquire the fragment stream distributed in an HTTP unicast manner; a unicast distribution unit that distributes the MPD and the fragment stream in the HTTP unicast manner; a FLUTE stream generating unit that generates a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and a multicast distribution unit that distributes the FLUTE stream and the SDP in a FLUTE multicast manner.

According to the first aspect of the present disclosure, an SDP is generated by describing information relating to the MPD in which information required for the reception side to acquire information relating to a FLUTE session distributing the FLUTE stream and the fragment stream corresponding to the FLUTE stream is described, and the FLUTE stream and the SDP are distributed in a FLUTE multicast manner.

According to a second aspect of the present disclosure, in a terminal device that receives and reproduces a FLUTE stream that is distributed in a FLUTE multicast manner from a content supplying apparatus, the content supplying apparatus includes: a fragment stream generating unit that generates a fragment stream based on source data of the content; an MPD generating unit that generates an MPD describing information required for a reception side to acquire the fragment stream distributed in an HTTP unicast manner; a unicast distribution unit that distributes the MPD and the fragment stream in the HTTP unicast manner; a FLUTE stream generating unit that generates a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and a multicast distribution unit that distributes the FLUTE stream and the SDP in a FLUTE multicast manner, the terminal device acquiring the SDP distributed in the FLUTE multicast manner and receiving the FLUTE stream distributed in the FLUTE multicast manner based on the acquired SDP.

In the terminal device according to the second aspect of the present disclosure, the MPD corresponding to the SDP may be acquired based on the acquired SDP, and the segment stream distributed in the HTTP unicast manner may be acquired based on the acquired MPD.

According to the second aspect of the present disclosure, the SDP distributed in the FLUTE multicast manner is acquired, and the FLUTE stream distributed in the FLUTE multicast manner is received based on the acquired SDP.

According to a third aspect of the present technology, in a content supplying system configured by a content supplying apparatus and a terminal device, the content supplying apparatus includes: a fragment stream generating unit that generates a fragment stream based on source data of the content; an MPD generating unit that generates an MPD describing information required for a reception side to acquire the fragment stream distributed in an HTTP unicast manner; a unicast distribution unit that distributes the MPD and the fragment stream in the HTTP unicast manner; a FLUTE stream generating unit that generates a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and a multicast distribution unit that distributes the FLUTE stream and the SDP in a FLUTE multicast manner. On the other hand, the terminal device acquires the SDP distributed in the FLUTE multicast manner and receives the FLUTE stream distributed in the FLUTE multicast manner based on the acquired SDP.

According to the third aspect of the present disclosure, an SDP is generated by the content supplying apparatus by describing information relating to the MPD in which information required for the reception side to acquire information relating to a FLUTE session distributing the FLUTE stream and the fragment stream corresponding to the FLUTE stream is described, and the FLUTE stream and the SDP are distributed in a FLUTE multicast manner. Meanwhile, the terminal device acquires the SDP distributed in the FLUTE multicast manner and receives the FLUTE stream distributed in the FLUTE multicast manner based on the acquired SDP.

Effects of the Invention

According to the first aspect of the present disclosure, a correspondence relation between a FLUTE stream distributed in the FLUTE multicast manner and a segment stream distributed in the HTTP unicast manner can be notified to the reception side.

According to the second aspect of the present disclosure, switching between a FLUTE stream distributed in the FLUTE multicast manner and a segment stream distributed in the HTTP unicast manner can be performed in a speedy manner.

According to a third aspect of the present disclosure, a correspondence relation between a FLUTE stream distributed in the FLUTE multicast manner and a segment stream distributed in the HTTP unicast manner can be notified to the reception side, and the reception side can perform switching between a FLUTE stream distributed in the FLUTE multicast manner and a segment stream distributed in the HTTP unicast manner.

BRIEF DESCRIPTION OF DRAWINGS

FIG. 4 is a diagram that illustrates an example of a description of an SDP.

FIG. 7 is a block diagram that illustrates an example of the configuration of a computer.

MODE FOR CARRYING OUT THE INVENTION

Hereinafter, a preferred embodiment (hereinafter, referred to as an embodiment) for performing the present disclosure will be described. Before that, a structure in which a packet is transmitted in a FLUTE session and an overview of this embodiment will be described.

Figure 1:
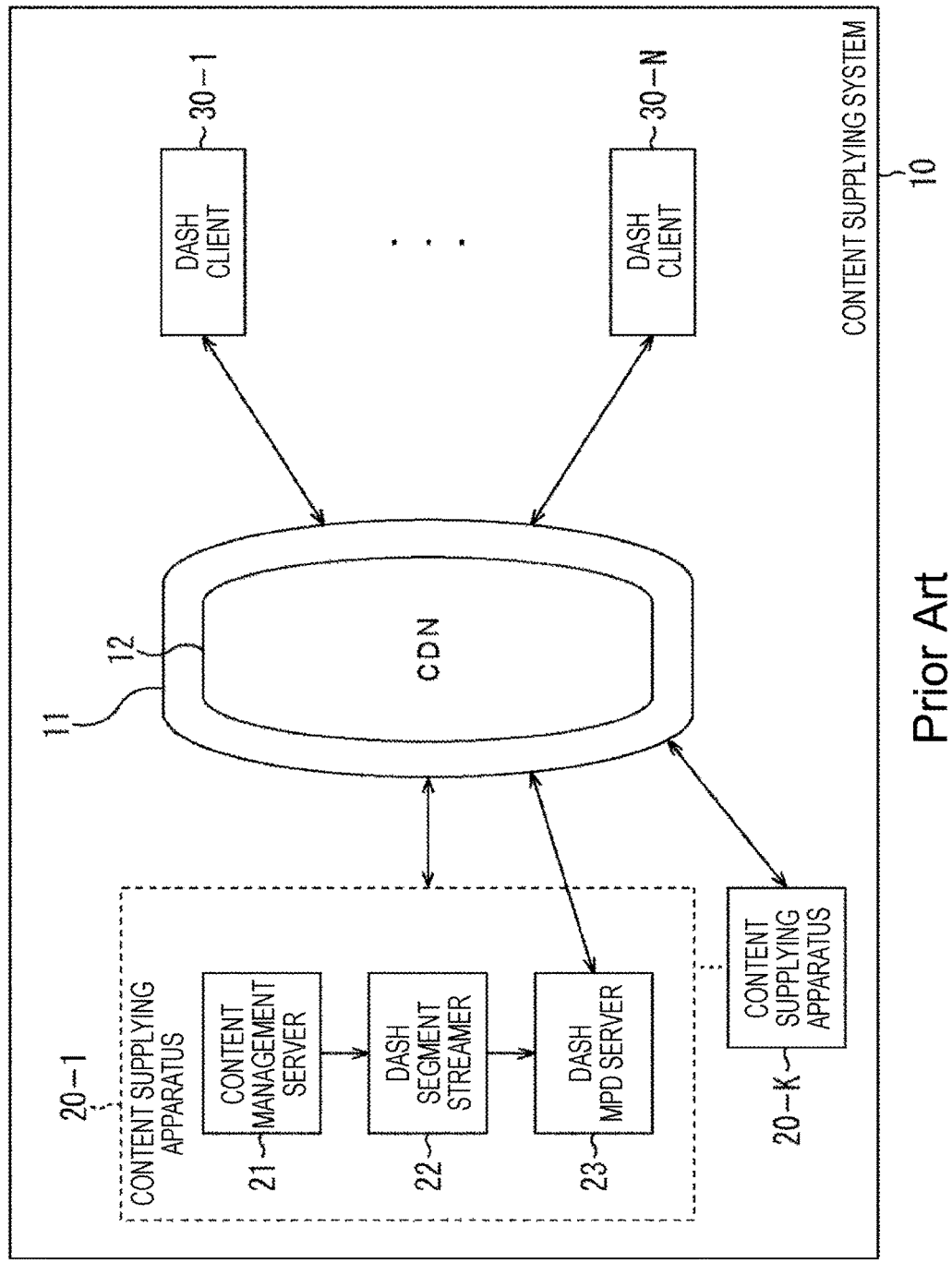
FIG. 1 is a block diagram that illustrates an example of the configuration of a conventional content supplying system.
Figure 2:
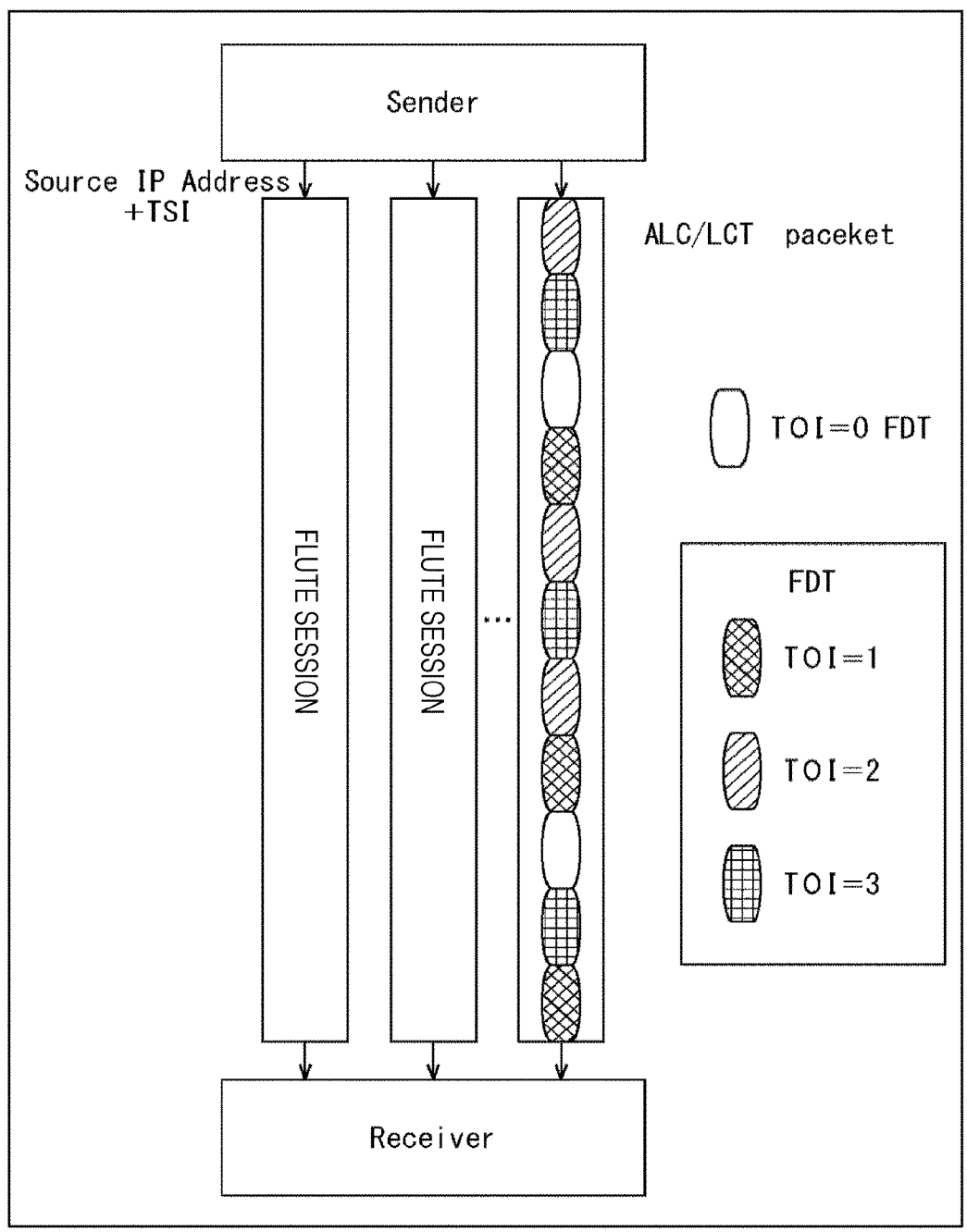
FIG. 2 is a diagram that illustrates an overview of a structure in which packets are transmitted in a FLUTE session.

FIG. 2 is a diagram that illustrates an overview of a structure in which packets are transmitted in a FLUTE session. As illustrated in the drawing, ALC packets are transmitted in a FLUTE session specified by a Source IP Address and a Transport Session Identifier (TSI) described in an SDP. In each ALC packet, for example, a video stream or an audio stream is stored, and, inside the FLUTE session, a unique Transport Object Identifier (TOI) is assigned thereto.

In addition, it is defined that TOI=0 is assigned to an ALC packet in which a File Delivery Table (FDT) is stored. A common TOI is assigned to ALC packets in which the other data is stored in a case where the data source is the same. For example, a common TOI is assigned to all the ALC packets in which sub video streams acquired by dividing a video stream are stored. Similarly, a common TOI is assigned to all the ALC packets in which sub audio streams acquired by dividing an audio stream are stored.

An FDT is periodically transmitted in a FLUTE session. In the FDT, attribute information relating to data stored in ALC packets of TOIs other than TOI=0 and information for reconfiguring the data are described.

On a side receiving a FLUTE session, first, an FDT of TOI=0 is acquired using the FLUTE session, and a desired ALC packet is received by analyzing the acquired FDT. For example, in a case where an ALC packet in which a video stream is stored is desired to be received, an FDT is acquired and analyzed, the TOI of an ALC packet in which the video stream is stored is checked, an ALC packet to which the TOI is assigned is acquired from the FLUTE session, and the ALC packet is reconfigured and reproduced.

However, in such a case, while the FDT is acquired and analyzed, an ALC packet in which a desired video stream is stored cannot be received, and reproduction of the desired video stream with an interrupt may occur. This is remarkable, as in case of live streaming or the like, when the retransmission number of times of the ALC packet is small or when the retransmission thereof is not performed.

Thus, in the present disclosure, in a FLUTE session, an elementary stream of a single media type is transmitted, and, before the acquisition of the FLUTE session, the reception side is notified of the media type, the reception mode, and the like by using a Session Media Protocol (SDP) transmitted in the presentation layer of the FLUTE.

Here, as such reception modes, three types including Promiscuous, One-copy, and Keep-updated defined in the 3GPP are assumed.

Promiscuous is a reception mode for urging the reception side to receive all the ALC packets transmitted in a FLUTE session. Promiscuous is considered to be operated to be notified in a case where the retransmission number of times of ALC packets is small, for example, as in case of live streaming or the like, or the retransmission is not performed.

One-copy is a reception mode for notifying the reception side that the presence/absence of an update of an ALC packet does not need to be monitored since an ALC packet that is transmitted once is not transmitted with the content thereof being updated. In addition, Keep-updated is a reception mode for notifying the reception side that the presence/absence of an update of an ALC packet needs to be monitored since there is a case where an ALC packet that has been transmitted once is transmitted with the content thereof being updated.

In addition, a combination of the reception modes of the three types described above, for example, Promiscuous+Keep-updated or the like may be added to the reception modes.

According to the present disclosure, in the SDP describing information relating to a FLUTE multicast distribution, a correspondence relation with an MPD describing information relating to a corresponding HTTP unicast distribution can be described.

More specifically, by introducing the following attribute row in a media description section (a session description section in a case where only a medium that is unique in the whole session defined in the SDP is defined) of the SDP, a correspondence between the SDP and AdaptationSet or Repesentation of the MPD can be defined.

a=mpd-mapping:<mpd url><adaptation set id><representation id><base url>

The attribute row has mpd-mapping as its attribute type and includes <mpd url>, <adaptation set id>, <representation id>, and <base url> as its description elements.

In <mpd url>, the url of the MPD is described. In <adaptation set id>, an id attribute (AdaptationSet/@id) of the AdaptationSet is described. In <representation id>, an id attribute (Representation/@id) of the Representation is described. In <base url>, a url (AdaptationSet/@BaseURL or Representation/@BaseURL) corresponding to AdaptationSet or Representation is described.

Example of Configuration of Content Supplying System

Figure 3:
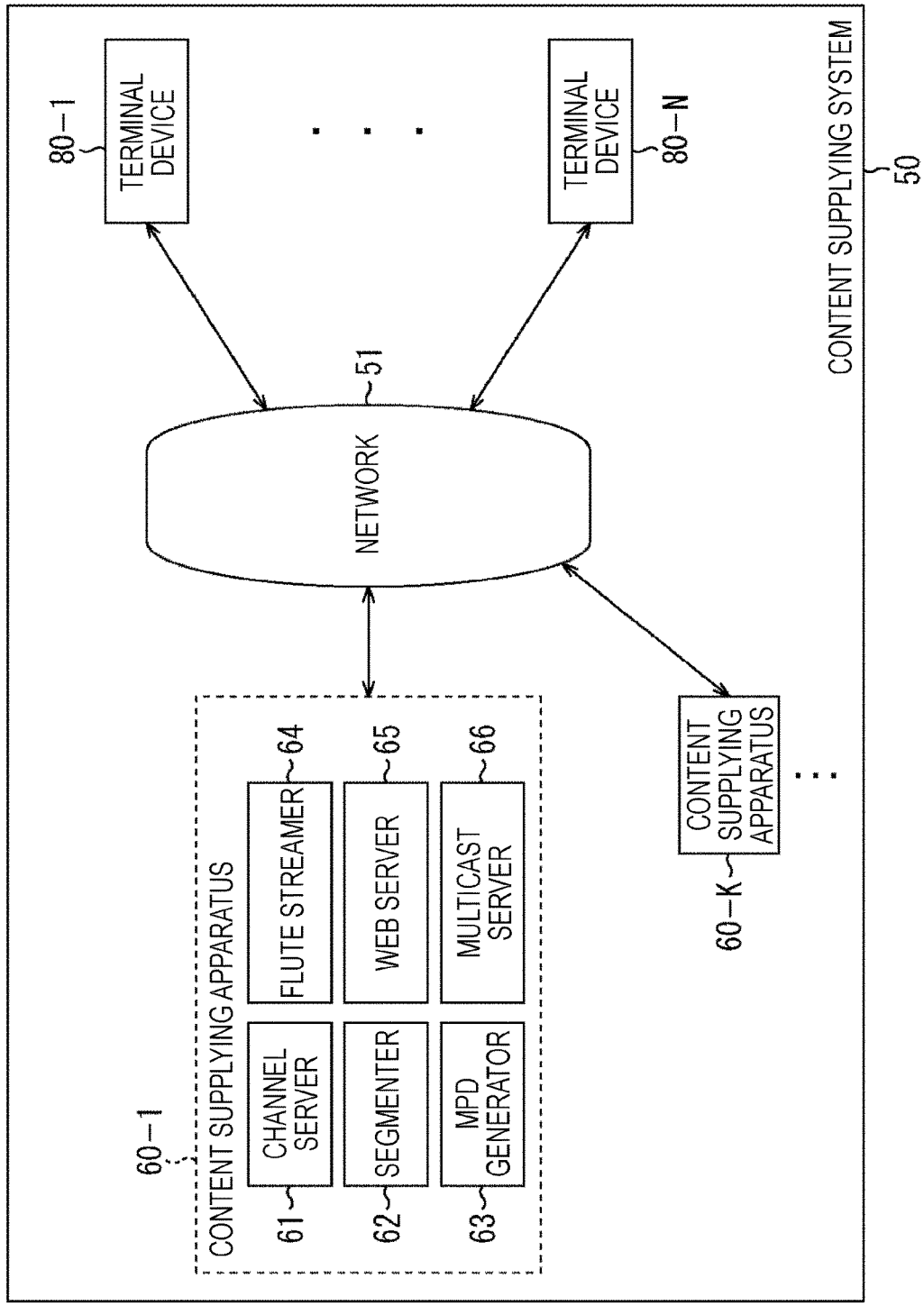
FIG. 3 is a block diagram that illustrates an example of the configuration of a content supplying system according to the present disclosure.

FIG. 3 is a block diagram that illustrates an example of the configuration of a content supplying system as an embodiment according to the present disclosure.

The content supplying system 50 is configured by a plurality of content supplying apparatuses 60 and a plurality of terminal devices 80. The content supplying apparatuses 60 and the terminal devices 80 can be connected together through a network 51.

The network 51 includes not only a bi-directional communication network represented by the Internet and a CDN using it but also various broadcast networks using a terrestrial broadcast wave, a satellite broadcast wave, a mobile broadcast (e) MBMS, and the like.

The content supplying apparatus 60 distributes a stream of a content in the HTTP unicast manner and the FLUTE multicast manner and includes: a channel server 61; a segmenter 62; an MPD generator 63; a FLUTE streamer 64; a web server 65; and a multicast server 66.

The channel server 61 to the multicast server 66 included in the content supplying apparatus 60 may be arranged in an integrated manner at one place or may be arranged in a distributed manner through the Internet or the like.

The channel server 61 generates a plurality of pieces of streaming data having mutually-different bit rates based on source data of a content to be distributed to the terminal device 80 and outputs the generated data to the segmenter 62.

The segmenter 62 generates a segment stream, for example, of a fragmented MP4 or the like by dividing each streaming data into segments with respect to time and outputs the generated segment stream to the FLUTE streamer 64 and the web server 65. In addition, the segmenter 62 notifies metadata including an address representing the supply source of the segment stream to the MPD generator 63.

The MPD generator 63 generates MPD describing an address representing the supply source (web server 65) of the file of the segment stream and the like based on the metadata notified from the segmenter 62 and outputs the generated MPD to the FLUTE streamer 64 and the web server 65. In this MPD, an acquisition place of an SDP in which the destination IP address of a FLUTE session of a FLUTE stream distributed in the FLUTE multicast manner, which is switchable from the segment stream distributed in the HTTP unicast manner, is described is described.

The FLUTE streamer 64 divides the segment stream that is sequentially input from the segmenter 62 and stores the divided segment stream in ALC packets so as to convert the segment stream into a FLUTE stream and outputs the FLUTE stream to the multicast server 66. In addition, the FLUTE streamer 64 stores the MPD generated by the MPD generator 63 in the ALC packet and outputs the ALC packet to the multicast server 66. Furthermore, the FLUTE streamer 64 describes an SDP relating to the FLUTE session and outputs the SDP to the multicast server 66.

The web server 65 distributes the MPD input from the MPD generator 63 in response to a request (HTTP request) from the terminal device 80 for the MPD to the request source in the HTTP unicast manner. In addition, the web server 65 distributes a file of a segment stream to the request source in response to a request (HTTP request) from the terminal device 80 for the segment stream in the HTTP unicast manner.

The multicast server 66 distributes the MPD, the SDP, and the FLUTE stream in the FLUTE multicast manner.

The terminal device 80 acquires an MPD from the content supplying apparatus 60 through the network 51. More specifically, the terminal device 80 transmits an HTTP request for requesting an MPD and receives an MPD distributed in the HTTP unicast manner or an MPD distributed in the FLUTE multicast manner in accordance therewith. In a case where the terminal device 80 receives an MPD distributed in the FLUTE multicast manner, announcement information in which a portal channel of the multicast server 66 performing the FLUTE multicast distribution is described is referred to.

In a case where the FLUTE multicast distribution is performed through the mobile broadcast (e) MBMS included in the network 51, the announcement information is known through an interaction channel or a broadcast multicast channel by using a User Service Description (USD) of the MBMS or the like. On the other hand, in a case where the FLUTE multicast distribution is performed through a terrestrial broadcast wave or a satellite broadcast included in the network 51, the announcement information is known through an interaction channel or a broadcast multicast channel by using an Electronic Service Guide (ESG) of DVB-H (IPDC) or the like.

In addition, the terminal device 80 transmits an HTTP request for requesting a segment stream to the web server 65 based on the acquired MPD and receives and reproduces a file of a segment stream that is distributed through the HTTP multicast manner in accordance therewith.

Furthermore, the terminal device 80 acquires an SDP based on the acquired MPD and receives and reproduces a FLUTE stream that is distributed in the FLUTE multicast manner based on the SDP. At this time, the reception mode described in the SDP is referred to. For example, in a case where the reception mode is Promiscuous, all the ALC packet transmitted in a corresponding FLUTE session are instantly received.

However, since there are cases where the reception side does not have a sufficient buffer capable of maintaining all the ALC packets, the reception side may be allowed to determine whether or not an operation corresponding to the reception mode notified using the SDP is performed.

Example of Description of SDP

Next, FIG. 4 illustrates an example of the description of an SDP.

The SDP is configured by a session description section and a media description section. Each of the session description section and the media description section has a text character string of one row in the form of <Type>=<value> as its basic configuration and is configured by a plurality of rows.

<type> is designated using one alphabetical character and represents a meaning of the row on the protocol. In <value>, a character string is described, and a unique format and a unique meaning are defined according to the corresponding type of <type>.

For example, the meaning of the alphabetical character described in <TYPE> of the session description section is as below.

v=(version of protocol)
o=(transmission source and session identifier)
s=(session name)
i=(session information)
a=(attribute relating to the whole session)
t=(a time during which session is active)

The meaning of the alphabetical character described in <TYPE> of the media description section is as below.

m=(media name and transmission address)
c=(connection information-optional in the case of being included in a session level)
b=(band information of zero or more rows)
a=(attribute relating to media)

According to the present disclosure, the following two kinds of the attribute type are newly defined and are introduced into the media description section.

(1) a=single-fmt:<media><encoding name><receive mode>

This attribute row has an attribute type of single-fmt and includes <media>, <encoding name>, and <receive mode> as description elements thereof.

In <media>, for example, video, audio, or the like is described as the media type. In <encoding name>, as a coding system, for example, H.264, H.261, GSM (registered trademark), or the like is described. In <promiscuous>, as a reception mode, promiscuous, One-copy, or Keep-updated is described. In addition, a combination thereof such as Promiscuous+Keep-updated or the like may be added to the reception modes.

"a=single-fmt:video H264/9000 promiscouos" described in the example illustrated in FIG. 4 represents that the media type is "video", the coding system is H.264, the time scale is 90 KHz, and the reception mode is "promiscouos".

In addition, "a=single-fmt:<media><encoding name><receive mode>" may be introduced into the session description section. In such a case, the described attribute type is handled as information relating to the whole FLUTE session.

(2) a=mpd-mapping:<mpd url><adaptation set id><representation id><base url>

The attribute row has "mpd-mapping" as its attribute type and includes <mpd url>, <adaptation set id>, <representation id>, and <base url> as its description elements. However, instead of describing all the description elements, only some thereof may be described.

In <mpd url>, the url of the MPD is described. In <adaptation set id>, an id attribute (AdaptationSet/@id) of the AdaptationSet is described. In <representation id>, an id attribute (Representation/@id) of the Representation is described. In <base url>, a url (AdaptationSet/@BaseURL or Representation/@BaseURL) corresponding to AdaptationSet or Representation is described.

"a=mpd-mapping: 111 222 http:/a.com/a" described in the example illustrated in FIG. 4 represents that AdaptationSet/@id=111, Representation/@id=222, and AdaptationSet/@BaseURL (or Representation/@baseURL)=http://a.com/a.

Figure 5:
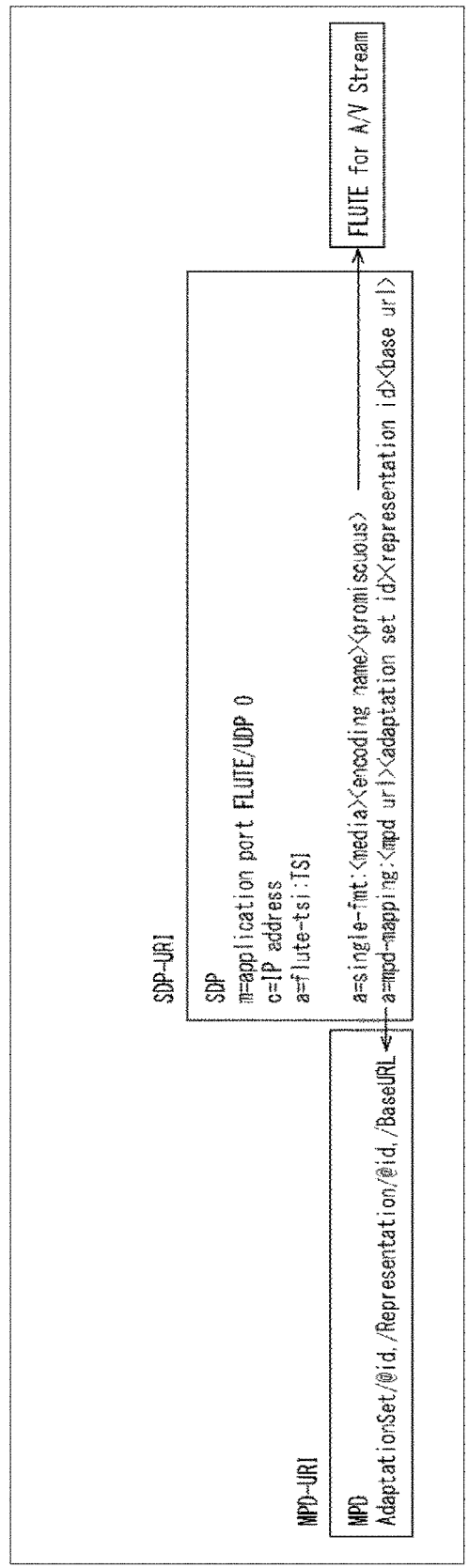
FIG. 5 is a diagram that illustrates a correspondence relation among an SDP, an MPD and a FLUTE session.
Figure 6:
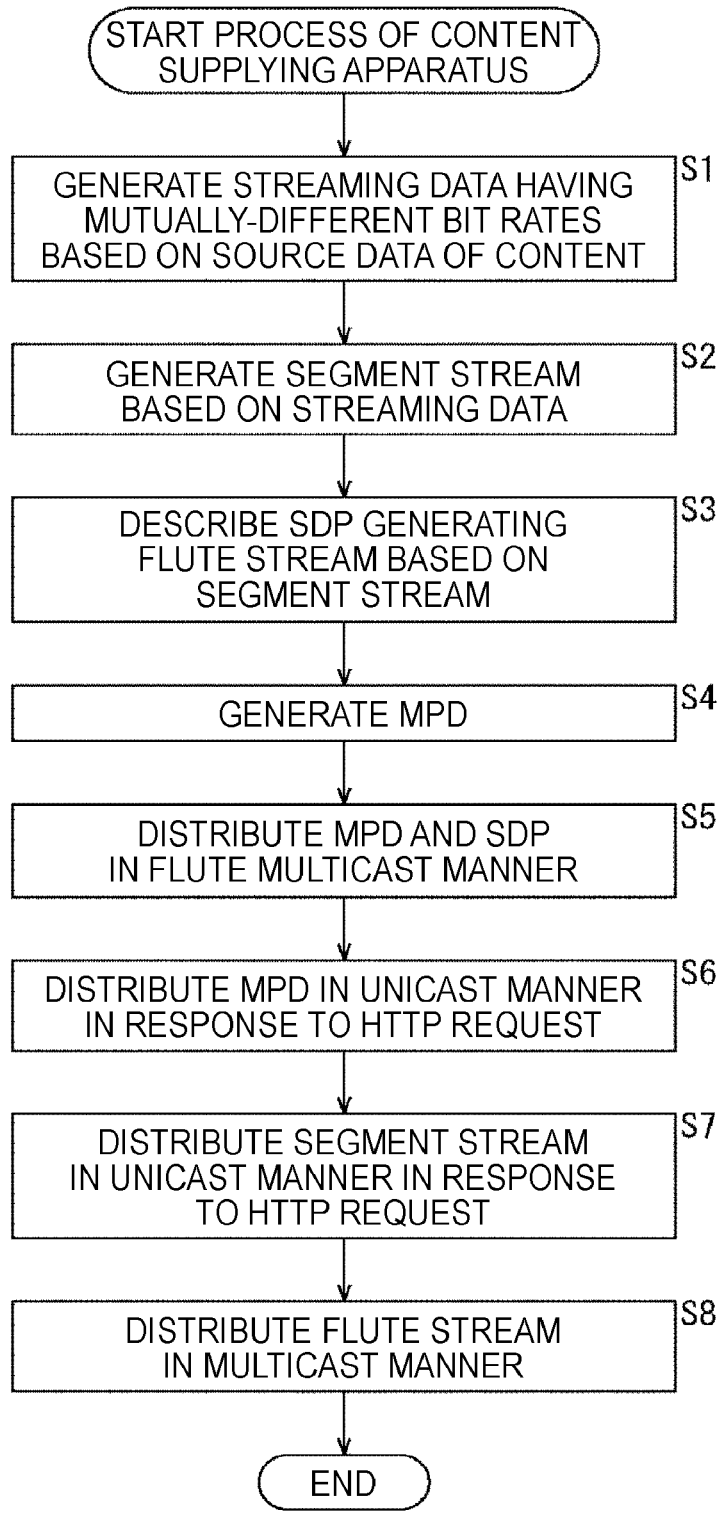
FIG. 6 is a flowchart that illustrates the process performed by a content supplying apparatus.

FIG. 5 illustrates a relation among an SDP that is in a state in which attribute rows of two kinds described above are newly added, an MPD corresponding thereto, and a FLUTE session distributing the FLUTE stream (A/V stream).

As in the diagram, by referring to "a=single-fmt:<media><encoding name><receive mode>" of the SDP, a FLUTE session distributing the FLUTE stream can be specified. In addition, by referring to "a=mpd-mapping:<mpd url><adaptation set id><representation id><base url>" of the SDP, AdaptationSet and Representation of an MPD corresponding to the FLUTE stream can be specified.

Operation of Content Supplying System 50

Next, the operation of the content supplying system 50 will be described.

FIG. 5 is a flowchart that illustrates a process (hereinafter, referred to the process of the content supplying apparatus) of the content supplying apparatus 60 for distributing a segment stream of a content in the HTTP unicast manner and distributing a FLUTE stream in the FLUTE multicast manner.

In Step S1, the channel server 61 generates a plurality of pieces of streaming data having mutually-different bit rates based on source data of a content to be distributed to the terminal device 80 and outputs the generated streaming data to the segmenter 62. In Step S2, the segmenter 62 generates a fragment stream of fragmented MP4 or the like based on each streaming data and outputs the generated segment stream to the FLUTE streamer 64 and the web server 65. In addition, the segmenter 62 notifies metadata including an address representing a supply source of the segment stream to the MPD generator 63.

In Step S3, the FLUTE streamer 64 converts the segment stream input from the segmenter 62 into a FLUTE stream and outputs the converted FLUTE stream to the multicast server 66. In addition, the FLUTE streamer 64 stores an MPD generated by the MPD generator 63 in an ALC packet and outputs the ALC packet to the multicast server 66. Furthermore, the FLUTE streamer 64 generates an SDP relating to a FLUTE session and outputs the generated SDP to the multicast server 66.

In Step S4, the MPD generator 63 generates an MPD describing an address representing a supply source (web server 65) of a file of the segment stream distributed in the HTTP unicast manner, an acquisition place of the SDP in which a target IP address of the FLUTE session of the FLUTE stream distributed in the FLUTE multicast manner, which is switchable from the segment stream, is described, and the like and outputs the generated MPD to the FLUTE streamer 64 and the web server 65.

In Step S5, the multicast server 66 distributes the MPD and the SDP in the FLUTE multicast manner.

In Step S6, the web server 65, in a case where there is a request for an MPD from the terminal device 80, distributes the MPD input from the MPD generator 63 to the request source in the HTTP unicast manner.

When the terminal device 80 that has received the MPD issues an HTTP request for requesting a segment stream based on the MPD, in Step S7, the web server 65 distributes a file of the requested segment stream to the request source in the HTTP unicast manner. The segment stream distributed in the HTTP unicast manner is received by the terminal device 80 and is reproduced.

Meanwhile, the multicast server 66, in Step S8, distributes the FLUTE stream in the FLUTE multicast manner. In a case where the FLUTE stream distributed in the FLUTE multicast manner is received by the terminal device 80, the terminal device 80 acquires an SDP based on the acquired MPD, analyzes the SDP, receives a FLUTE session distributing the FLUTE stream, and initially acquires an FDT. In addition, based on the FDT, ALC packets including a desired FLUTE stream are extracted from the FLUTE session, and the FLUTE stream is reconfigured and reproduced.

When switching from the FLUTE stream distributed in the FLUTE multicast manner to the segment stream distributed in the HTTP unicast manner is performed, an attribute row starting with "a=mpd-mapping" of the SDP is referred to.

In addition, when the SDP is analyzed, the reception mode described in the SDP is referred to. More specifically, in a case where the reception mode is Promiscuous, before the acquisition, the analysis, and the like of the FDT, all the ALC packets transmitted in a corresponding FLUTE session are instantly received. However, whether or not an operation corresponding to the reception mode notified in the SDP is performed may be determined by the reception side, and thus, the supply side does not forcibly control the operation of the terminal device 80.

As described above, according to the process of the content supplying apparatus, the terminal device 80 can be notified of the correspondence relation between an SDP and an MPD, in other words, the correspondence relation between a FLUTE stream distributed in the FLUTE multicast manner and a segment stream distributed in the HTTP unicast manner. Accordingly, switching between the FLUTE stream and the segment stream can be performed in a speedy manner.

In addition, according to the process of the content supplying apparatus, before the reception of a FLUTE session is started, the terminal device 80 can notify a reception mode that is appropriate for the reception to the terminal device 80. Accordingly, it can be suppressed that missing of an ALC packet on the terminal device 80 side and the like occur. In addition, since this notification is not a control process enforcing the operation of the terminal device 80 side, it can be suppressed that a situation, in which a buffer disposed on the terminal device 80 side overflows, occurs.

The content supplying apparatus 60 and the terminal device 80 performing the series of the processes described above can be realized as a computer executes software instead of respectively configuring them using hardware. This computer includes a computer built in dedicated hardware, a personal computer, for example, of a general purpose, capable of executing various functions by installing various programs, and the like.

FIG. 7 is a block diagram that illustrates an example of the hardware configuration of the computer described above.

In the computer 200, a Central Processing Unit (CPU) 201, a Read Only Memory (ROM) 202, and a Random Access Memory (RAM) 203 are interconnected through a bus 204.

In addition, an input/output interface 205 is connected to the bus 204. An input unit 206, an output unit 207, a storage unit 208, a communication unit 209, and a drive 210 are connected to the input/output interface 205.

The input unit 206 is configured by a keyboard, a mouse, a microphone, and the like. The output unit 207 is configured by a display, a speaker, and the like. The storage unit 208 is configured by a hard disk, a non-volatile memory, and the like. The communication unit 209 is configured by a network interface and the like. The drive 210 drives a removable medium 211 such as a magnetic disk, an optical disc, a magneto-optical disk, or a semiconductor memory.

In the computer 200 configured as above, the CPU 201, for example, loads a program stored in the storage unit 208 into the RAM 203 through the input/output interface 205 and the bus 204 and executes the loaded program, thereby executing the series of the processes described above.

The program executed by the computer 200 (the CPU 201), for example, may be provided with being recorded on the removable medium 211 as a package medium or the like. In addition, the program may be provided through a wired or wireless transmission medium such as a local area network, the Internet, or digital satellite broadcast.

In the computer 200, by loading the removable medium 211 into the drive 210, the program can be installed to the storage unit 208 through the input/output interface 205. In addition, the program may be received by the communication unit 209 through a wired or wireless transmission medium and be installed to the storage unit 208. Furthermore, the program may be installed to the ROM 202 or the storage unit 208 in advance.

In addition, the program executed by the computer 200 may be a program that executes the processes in a time series along the sequence described in this specification or a program that executes the processes in a parallel manner or at necessary timing such as at the timing of being called.

An embodiment of the present disclosure is not limited to the embodiments described above, but various changes can be made therein in a range not departing from the concept of the present disclosure.

The present disclosure may also take configurations as below.

(1)

A content supplying apparatus distributing a content by using an adaptive streaming technology, the content supplying apparatus including:

a fragment stream generating unit that generates a fragment stream based on source data of the content;

an MPD generating unit that generates an MPD describing information required for a reception side to acquire the fragment stream distributed in an HTTP unicast manner;

a unicast distribution unit that distributes the MPD and the fragment stream in the HTTP unicast manner;

a FLUTE stream generating unit that generates a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and a multicast distribution unit that distributes the FLUTE stream and the SDP in a FLUTE multicast manner.

(2)

The content supplying apparatus according to (1), wherein the FLUTE stream generating unit describes the information relating to the MPD in the SDP by using an attribute row defined for describing the information relating to the MPD.

(3)

The content supplying apparatus according to (2), wherein the attribute row is "a=mpd-mapping:<mpd url><adaptation set id><representation id><base url>".

(4)

The content supplying apparatus according to (2) or (3), wherein the FLUTE stream generating unit describes at least one of <mpd url>, <adaptation set id>, <representation id>, and <base url> that are description elements of the attribute row in the SDP.

(5)

The content supplying apparatus according to any of (1) to (4), wherein the FLUTE stream generating unit further describes a reception mode in the SDP by using an attribute row defined for describing the reception mode of a case where the FLUTE session distributing the FLUTE stream is received by the reception side.

(6)

The content supplying apparatus according to (5), wherein the attribute row is "a=single-fmt: <media><encoding name><receive mode>".

(7)

The content supplying apparatus according to (5) or (6), wherein the FLUTE stream generating unit describes one of Promiscuous, One-copy, and Keep-updated in "<receive mode>" of the attribute row as the reception mode.

(8)

A content supplying method used in a content supplying apparatus distributing a content by using an adaptive streaming technology, the content supplying method including:

a fragment stream generating step of generating a fragment stream based on source data of the content;

an MPD generating step of generating an MPD describing information required for a reception side to acquire the fragment stream distributed in an HTTP unicast manner;

a unicast distributing step of distributing the MPD and the fragment stream in the HTTP unicast manner;

a FLUTE stream generating step of generating a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and a multicast distributing step of distributing the FLUTE stream and the SDP in a FLUTE multicast manner, the fragment stream generating step, the MPD generating step, the unicast distributing step, the FLUTE stream generating step, and the multicast distributing step being performed by the content supplying apparatus.

(9)

A program causing a computer distributing a content by using an adaptive streaming technology to function as:

a fragment stream generating unit that generates a fragment stream based on source data of the content;

an MPD generating unit that generates an MPD describing information required for a reception side to acquire the fragment stream distributed in an HTTP unicast manner;

a unicast distribution unit that distributes the MPD and the fragment stream in the HTTP unicast manner;

a FLUTE stream generating unit that generates a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and a multicast distribution unit that distributes the FLUTE stream and the SDP in a FLUTE multicast manner.

(10)

A terminal device that receives and reproduces a FLUTE stream that is distributed in a FLUTE multicast manner from a content supplying apparatus, the content supplying apparatus including a fragment stream generating unit that generates a fragment stream based on source data of the content, an MPD generating unit that generates an MPD describing information required for a reception side to acquire the fragment stream distributed in an HTTP unicast manner, a unicast distribution unit that distributes the MPD and the fragment stream in the HTTP unicast manner, a FLUTE stream generating unit that generates a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described, and a multicast distribution unit that distributes the FLUTE stream and the SDP in a FLUTE multicast manner, the terminal device acquiring the SDP distributed in the FLUTE multicast manner and receiving the FLUTE stream distributed in the FLUTE multicast manner based on the acquired SDP.

(11)

The terminal device according to (10), wherein the MPD corresponding to the SDP is acquired based on the acquired SDP, and the segment stream distributed in the HTTP unicast manner is acquired based on the acquired MPD.

(12)
A content supplying system configured by a content supplying apparatus and a terminal device,
the content supplying apparatus including:
a fragment stream generating unit that generates a fragment stream based on source data of the content;
an MPD generating unit that generates an MPD describing information required for a reception side to acquire the fragment stream distributed in an HTTP unicast manner;
a unicast distribution unit that distributes the MPD and the fragment stream in the HTTP unicast manner;
a FLUTE stream generating unit that generates a FLUTE stream based on the fragment stream and generates an SDP by describing information relating to the MPD in which information required for the reception side to acquire information relating to a FLUTE session distributing the FLUTE stream and the fragment stream corresponding to the FLUTE stream is described; and
a multicast distribution unit that distributes the FLUTE stream and the SDP in a FLUTE multicast manner,
the terminal device acquiring the SDP distributed in the FLUTE multicast manner and receiving the FLUTE stream distributed in the FLUTE multicast manner based on the acquired SDP.

REFERENCE SIGNS LIST

50 Content supplying system
51 Network
60 Content supplying apparatus
61 Channel server
62 Segmenter
63 Generator
64 FLUTE streamer
65 Web server
66 Multicast server
80 Terminal device
200 Computer
201 CPU

The invention claimed is:

1. A content supplying apparatus distributing a content by using an adaptive streaming technology, the content supplying apparatus comprising:
circuitry configured to
generate a fragment stream based on source data of the content;
generate a media presentation description (MPD) describing information required for a reception side to acquire the fragment stream distributed in a Hypertext Transfer Protocol (HTTP) unicast manner;
distribute the MPD and the fragment stream in the HTTP unicast manner;
generate a unidirectional transport stream based on the fragment stream and generate a session media protocol (SDP) by describing information relating to the MPD including information required for the reception side to acquire information relating to a unidirectional transport session distributing the unidirectional transport stream and the fragment stream corresponding to the unidirectional transport stream is described; and
distribute the unidirectional transport stream and the SDP in a unidirectional transport multicast manner,
wherein the circuitry describes the information relating to the MPD in the SDP by using an attribute row describing correspondence including at least one of an acquiring address of the MPD, an identification of an adaptation set in the MPD, an identification of a representation in the MPD, and an address of either the adaptation set and the representation.

2. The content supplying apparatus according to claim 1, wherein the circuitry further describes a reception mode in the SDP by using an attribute row defined for describing the reception mode of a case where the unidirectional transport session distributing the unidirectional transport stream is received by the reception side.

3. The content supplying apparatus according to claim 2, wherein the attribute row defined for describing the reception mode is "a=single-fmt<media><encoding name><receive mode>".

4. The content supplying apparatus according to claim 2, wherein the circuitry describes one of Promiscuous, One-copy, and Keep-updated in the attribute row as the reception mode.

5. A content supplying method used in a content supplying apparatus distributing a content by using an adaptive streaming technology, the content supplying method comprising:
generating a fragment stream based on source data of the content;
generating a media presentation description (MPD) describing information required for a reception side to acquire the fragment stream distributed in a Hypertext Transfer Protocol (HTTP) unicast manner;
distributing the MPD and the fragment stream in the HTTP unicast manner;
generating a unidirectional transport stream based on the fragment stream and generating a session media protocol (SDP) by describing information relating to the MPD including information required for the reception side to acquire information relating to a unidirectional transport session distributing the unidirectional transport stream and the fragment stream corresponding to the unidirectional transport stream is described; and
distributing the unidirectional transport stream and the SDP in a unidirectional transport multicast manner,
the generating the fragment stream, the generating the MPD, the distributing the MPD, the generating the unidirectional transport stream, and the distributing the unidirectional transport stream being performed by the content supplying apparatus,
wherein the generating the unidirectional transport stream describes the information relating to the MPD in the SDP by using an attribute row describing correspondence including at least one of an acquiring address of the MPD, an identification of an adaptation set in the MPD, an identification of a representation in the MPD, and an address of either the adaptation set and the representation.

6. A non-transitory computer readable medium including a computer program causing a computer distributing a content by using an adaptive streaming technology to perform a method comprising:
generating a fragment stream based on source data of the content;
generating a media presentation description (MPD) describing information required for a reception side to acquire the fragment stream distributed in a Hypertext Transfer Protocol (HTTP) unicast manner;
distributing the MPD and the fragment stream in the HTTP unicast manner;
generating a unidirectional transport stream based on the fragment stream and generating a session media protocol (SDP) by describing information relating to the MPD including information required for the reception side to acquire information relating to a unidirectional transport session distributing the unidirectional transport stream and the fragment stream corresponding to the unidirectional transport stream is described; and distributing the unidirectional transport stream and the SDP in a unidirectional transport multicast manner, wherein the generating the unidirectional transport stream describes the information relating to the MPD in the SDP by using an attribute row describing correspondence including at least one of an acquiring address of the MPD, an identification of an adaptation set in the MPD, an identification of a representation in the MPD, and an address of either the adaptation set and the representation.

7. A receiving device comprising:

circuitry configured to receive via multicast a session media protocol (SDP) describing information relating to a media presentation description (MPD) describing information required for the receiving device to acquire a fragment stream distributed in a Hypertext Transfer Protocol (HTTP) unicast manner, the MPD being generated based on source data of a content, and the SDP including information required for the receiving device to acquire information relating to a unidirectional transport session distributing a unidirectional transport stream and the fragment stream corresponding to the unidirectional transport stream; and receive via multicast, based on the SDP, the unidirectional transport stream generated based on the fragment stream, wherein the SDP describes the information relating to the MPD by using an attribute row describing correspondence including at least one of an acquiring address of the MPD, an identification of an adaptation set in the MPD, an identification of a representation in the MPD, and an address of either the adaptation set and the representation.

8. The receiving device according to claim 7, wherein the MPD is acquired based on the received SDP, and the fragment stream distributed in the HTTP unicast manner is acquired based on the acquired MPD.

9. The receiving device according to claim 7, wherein the SDP in an attribute row describes a reception mode describing a mode for receiving the unidirectional transport stream.

10. The receiving device according to claim 9, wherein the receiving mode is one of Promiscuous, One-copy, and Keep-updated.

11. A content supplying system comprising:

a content supplying apparatus; and a receiving device, the content supplying apparatus comprising circuitry configured to generate a media presentation description (MPD) describing information required for the receiving device to acquire a fragment stream distributed in a Hypertext Transfer Protocol (HTTP) unicast manner;

distribute the MPD and the fragment stream in the HTTP unicast manner;

generate a unidirectional transport stream based on the fragment stream and generate a session media protocol (SDP) by describing information relating to the MPD including information required for the receiving device to acquire information relating to a unidirectional transport session distributing the unidirectional transport stream and the fragment stream corresponding to the unidirectional transport stream is described; and distribute the unidirectional transport stream and the SDP in a unidirectional transport multicast manner, wherein the circuitry describes the information relating to the MPD in the SDP by using an attribute row describing correspondence including at least one of an acquiring address of the MPD, an identification of an adaptation set in the MPD, an identification of a representation in the MPD, and an address of either the adaptation set and the representation, and the receiving device acquires the SDP distributed in the unidirectional transport multicast manner and receives the unidirectional transport stream distributed in the unidirectional transport multicast manner based on the acquired SDP.

12. A receiving method comprising:

receiving via multicast a session media protocol (SDP) describing information relating to a media presentation description (MPD) describing information required for a receiving device to acquire a fragment stream distributed in a Hypertext Transfer Protocol (HTTP) unicast manner, the MPD being generated based on source data of a content, and the SDP including information required for the receiving device to acquire information relating to a unidirectional transport session distributing a unidirectional transport stream and the fragment stream corresponding to the unidirectional transport stream; and receiving via multicast, based on the SDP, the unidirectional transport stream generated based on the fragment stream, wherein the SDP describes the information relating to the MPD by using an attribute row describing correspondence including at least one of an acquiring address of the MPD, an identification of an adaptation set in the MPD, an identification of a representation in the MPD, and an address of either the adaptation set and the representation.

13. The receiving method according to claim 12, wherein the MPD is acquired based on the received SDP, and the fragment stream distributed in the HTTP unicast manner is acquired based on the acquired MPD.

14. The receiving method according to claim 12, wherein the SDP in an attribute row describes a reception mode describing a mode for receiving the unidirectional transport stream.

15. The receiving method according to claim 14, wherein the receiving mode is one of Promiscuous, One-copy, and Keep-updated.

16. A non-transitory computer readable medium including a computer program causing a computer receiving a content by using an adaptive streaming technology to perform a method comprising:

receiving via multicast a session media protocol (SDP) describing information relating to a media presentation description (MPD) describing information required for a receiving device to acquire a fragment stream distributed in a Hypertext Transfer Protocol (HTTP) unicast manner, the MPD being generated based on source data of a content, and the SDP including information required for the receiving device to acquire information relating to a unidirectional transport session distributing a unidirectional transport stream and the fragment stream corresponding to the unidirectional transport stream; and receiving via multicast, based on the SDP, the unidirectional transport stream generated based on the fragment stream, wherein the SDP describes the information relating to the MPD by using an attribute row describing correspondence including at least one of an acquiring address of the MPD, an identification of an adaptation set in the MPD, an identification of a representation in the MPD, and an address of either the adaptation set and the representation.

\* \* \* \* \*